United States Patent [19]

Ishida et al.

[11] 4,347,933
[45] Sep. 7, 1982

[54] CASE FOR HOLDING MAGNETIC TAPE CASSETTE

[75] Inventors: Toshihiko Ishida, Komoro; Kimio Tanaka, Saku, both of Japan

[73] Assignee: TDK Electronics Co., Ltd., Tokyo, Japan

[21] Appl. No.: 167,411

[22] Filed: Jul. 11, 1980

[30] Foreign Application Priority Data

Jul. 17, 1979 [JP] Japan .................. 54-97567[U]

[51] Int. Cl.³ .................. B65D 85/67; B65H 17/02; B65H 75/00
[52] U.S. Cl. .................. 206/387; 242/68.3; 242/199; 206/493
[58] Field of Search ............ 206/387, 493; 242/68.3, 242/199

[56] References Cited

U.S. PATENT DOCUMENTS 3,272,325 9/1966 Schoenmakers .................. 206/387
3,456,892 7/1969 Krumbein et al. ............... 242/68.3
3,666,193 5/1972 Wellington et al. .............. 242/199

Primary Examiner—William T. Dixson, Jr.
Attorney, Agent, or Firm—Wegner, McCord, Wood & Dalton

[57] ABSTRACT

A case for holding a magnetic tape cassette has flat locking projections or tabs upright from the inner wall surface thereof to engage the hubs of the magnetic tape cassette and thereby lock the hubs unrotatably. The locking tabs are formed with a step each in the upper part. The step of each said tab is parallel or inclined to the place of the inner wall surface.

4 Claims, 8 Drawing Figures

CASE FOR HOLDING MAGNETIC TAPE CASSETTE

BACKGROUND OF THE INVENTION

This invention relates to a case for holding a magnetic tape cassette.

As illustrated in FIG. 1, an ordinary magnetic tape cassette 2 is commonly placed in a case 4, while not in use, for its protection as well as for convenience of handling. An additional function of the case is to lock the supply and takeup reels or hubs 6 of the cassette 2 lest a length of magnetic tape on the both hubs move from one hub to the other while being contained in the case. To that end, the case 4 is formed with flat locking projections or tabs 8 upright at points of the bottom wall of the case where they meet the hubs 6 of the magnetic tape cassette 2. (Refer also to FIG. 2) The upright tabs 8 are so shaped and located as to enter among the inwardly protruding spokes 10 of the hubs to lock them from unwanted rotation.

Generally, the case 4 comprises a main body 4a having the locking tabs 8 and a turnable lid 4b hingedly secured to the body 4a. The turnable lid 4b has a pocket 4c in which it receives the magnetic tape cassette 2 and pivots in the direction of the arrow A onto the body to the closed state shown in FIG. 3. The magnetic tape cassette 2 is contained in the manner, as indicated in FIG. 3, resting at one end of steps 5' of stepped support ribs 5 formed on the inner end wall surface of the case body 4a. The upright tabs 8 remain engaged with the spokes 10 of the hubs 6 as shown in FIG. 1.

Actually, it is not uncommon, as FIGS. 4 to 6 indicate, that the tip of any of the inwardly protruding spokes 10 of the hubs 6 comes gradually into contact, as at 11' and 11", with the edge 9 of any of the tabs 8, instead of properly engaging the latter, and is guided by the edge 9 into the encased state. This means that the magnetic tape cassette is forced into the case through pressure contact with either or both of the upright tabs 8 and the stepped support rib or ribs 5. Understandably, the case 4 will become too tight to open, resulting in a breakage of the case and even the cassette hub or hubs themselves.

The present invention has for its object the provision of a novel case for holding a magnetic tape cassette, with upright tabs uniquely shaped to solve the aforementioned problems of the conventional cases.

SUMMARY OF THE INVENTION

The magnetic tape cassette case according to the invention has flat projections or tabs formed with a step each in the upper part. The step of each said tab is parallel or inclined to the plane of the inner wall surface. In a preferred embodiment of the case, the angle of inclination is not more than 45°.

The magnetic tape cassette case according to the invention is of extremely great utility value, because it can always satisfactorily contain and hold the magnetic tape cassette, whenever the latter is to be encased, without any damage to the case or the magnetic tape cassette.

BRIEF DESCRIPTION OF THE DRAWINGS

The above mentioned object and advantage of the invention will be more clearly understood from the following description taken in conjunction with the accompanying drawings showing embodiments thereof. In the drawings.

DESCRIPTION OF THE PREFERRED EMBODIMENTS

Figure 7:
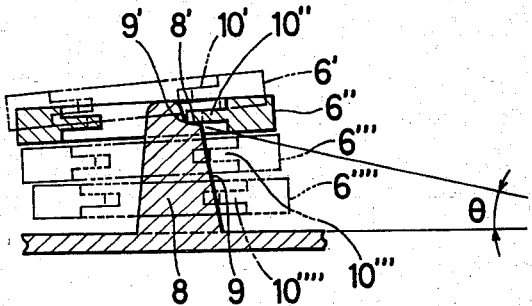
FIG. 7 is an enlarged sectional view showing a locking tab of a magnetic tape cassette case according to the invention and a hub in engagement.

The magnetic tape cassette case according to the invention will now be described with reference to FIG. 7.

Figure 4:
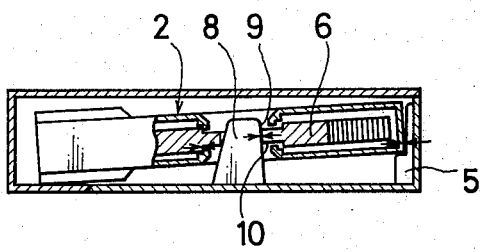
FIG. 4 is a sectional side view showing the magnetic tape cassette improperly contained in the case.
Figure 5:
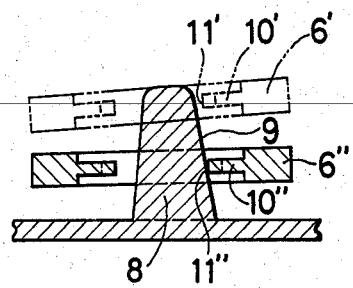
FIG. 5 is an enlarged sectional view showing how a locking tab of a conventional magnetic tape cassette case engages a hub of the cassette.
Figure 6:
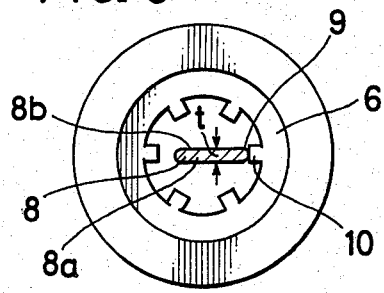
FIG. 6 is a plan view showing a locking tab and a hub in improper engagement.

As will be clear upon comparison with the ordinary case shown in FIG. 5, the case of the invention is strikingly distinct in that its upright tabs 8 have a step 8' each. The present applicant has found that, with such a tab 8 having a step 8' in its upper part, any of the spokes 10' of the hub 6' that is brought into contact with, and guided downward along, the edge 9' of the tab 8 will naturally be contacted and deflected by the step 8' underneath toward either side 8a or 8b of the tab 8. This eliminates the possibility of the tip of the spoke 10 being guided in contact with the edge of the tab 8 until the magnetic tape cassette is completely encased as indicated in FIGS. 5 and 6. With the case according to the invention, it can still occur, when closing the case with the magnetic tape cassette inside, that the edge 9 of one of the upright tabs and one of the spokes 10 of a hub are in radial alignment. In that case, however, the hub 6 will be forcibly turned aside, without fail, by the step 8' of the particular tab into regular engagement; the danger of the cassette being seized between the tabs 8 and stepped support ribs 5 as shown in FIGS. 4 to 6 can be averted.

Experiments have revealed that there is no limitation to the dimensions of the step 8' provided that the step is formed in the upper part of the upright tab, but its angle $\theta$ of inclination to the bottom wall of the case body is desired to be not more than 45°. Of course, the step may be parallel instead with the plane of the body.

Figure 1:
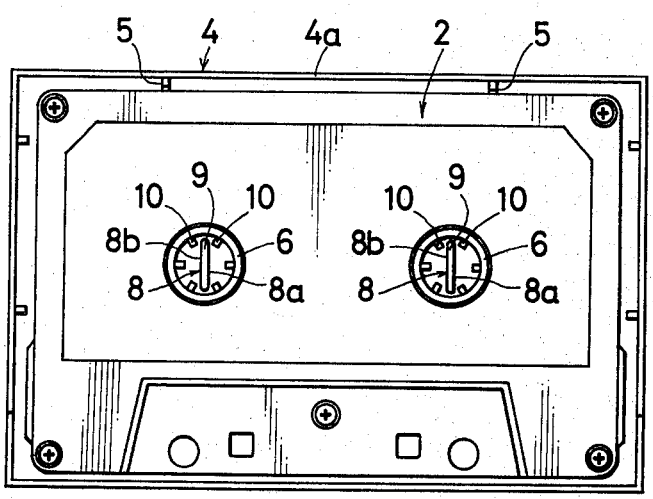
FIG. 1 is a plan view of a case holding a magnetic tape cassette, with the lid taken away.
Figure 8:
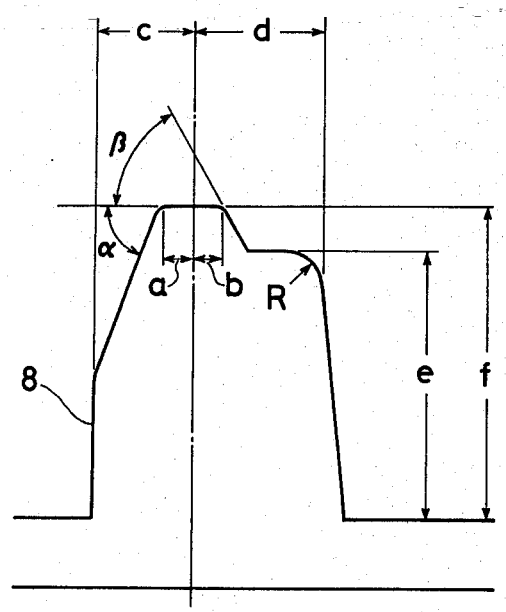
FIG. 8 is a sectional view of a locking tab of a magnetic tape cassette case as an embodiment of the invention.
Figure 2:
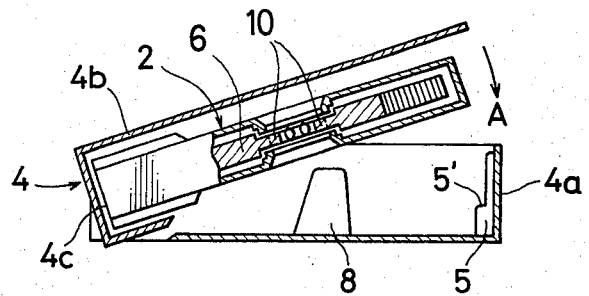
FIG. 2 is a sectional side view showing the manner in which the magnetic tape cassette is contained in the case.
Figure 3:
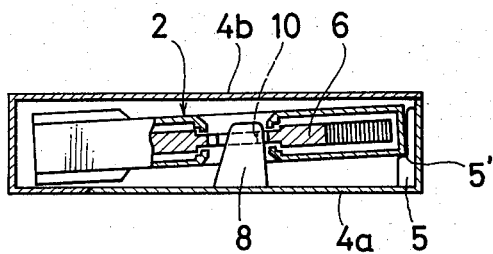
FIG. 3 is a sectional side view showing the magnetic tape cassette properly contained in the case.

FIG. 8 shows a tab formed in a case as an embodiment of the invention. The tab with the following dimensions proved most useful experimentally:

Tab thickness, t=1 mm
Inclination angle of tab step, $\theta=0°$ (parallel)
a=1.1
b=1.1
c=4.5
d=6
e=9.2
f=11.5
$\alpha=65°$ $\beta = 45°$ $R = 1.1$ However, it will be obvious to those skilled in the art that the tab according to the invention is not limited to the one of the particular shape just illustrated.

The magnetic tape cassette case according to the invention, with the construction described above, is of extremely great utility value, because it can always satisfactorily contain and hold the magnetic tape cassette, whenever the latter is to be encased, without any damage to the case or the magnetic tape cassette.

While preferred embodiments of the invention have been described using specific terms, such description is for illustrative purposes only, and it is to be understood that changes and variation may be made without departing from the spirit or scope of the following claims.

What is claimed is:

1. A case for holding a magnetic tape cassette, the case having flat locking projections or tabs upright from the inner wall surface thereof to engage the hubs of the magnetic tape cassette and thereby lock the hubs unrotatably, characterized in that said locking tabs have a uniform thickness and have a step formed in the upper part of each said locking tab.

2. A case for holding a magnetic tape cassette according to claim 1, in which said step of each said tab is parallel to the plane of the wall surface from which said tab is transversely disposed.

3. A case for holding a magnetic tape cassette according to claim 1, in which said step of each said tab is inclined to the plane of the wall surface from which said tab is transversely disposed.

4. A case for holding a magnetic tape cassette according to claim 3, in which the angle of inclination of the step is not more than 45°.

* * * * *